(12) United States Patent
Lee et al.

(10) Patent No.: US 9,107,540 B2
(45) Date of Patent: *Aug. 18, 2015

(54) HANDHELD ELECTRIC MIXER

(75) Inventors: William Kwok Kay Lee, Hong Kong (CN); Mei Chee Choi, legal representative, Hong Kong (CN); Bo Gao, Hong Kong (CN)

(73) Assignee: Main Power Electrical Factory Ltd., Kwun Tong, Kowloon (HK)

( * ) Notice: Subject to any disclaimer, the term of this patent is extended or adjusted under 35 U.S.C. 154(b) by 527 days.

This patent is subject to a terminal disclaimer.

(21) Appl. No.: 13/453,613

(22) Filed: Apr. 23, 2012

(65) Prior Publication Data

US 2012/0228968 A1    Sep. 13, 2012

Related U.S. Application Data

(63) Continuation-in-part of application No. 11/867,924, filed on Oct. 5, 2007, now Pat. No. 8,162,530.

(51) Int. Cl.
| | |
|---|---|
| *A47J 43/044* | (2006.01) |
| *A47J 43/08* | (2006.01) |
| *H02K 7/116* | (2006.01) |
| *H02K 7/14* | (2006.01) |

(52) U.S. Cl.
CPC ............ *A47J 43/082* (2013.01); *H02K 7/116* (2013.01); *H02K 7/145* (2013.01); *A47J 2043/04418* (2013.01); *F16H 2200/0034* (2013.01)

(58) Field of Classification Search
CPC ...................................................... A47J 43/082
USPC ......... 416/122, 170 R; 310/50; 366/129, 206, 366/343, 344, 601
See application file for complete search history.

(56) References Cited

U.S. PATENT DOCUMENTS

| | | |
|---|---|---|
| 1,372,279 A | 3/1921 | Collins |
| 1,506,951 A | 9/1924 | Soukup |
| 1,774,509 A | 9/1930 | Gould |
| 1,905,114 A | 4/1933 | Lauterbur et al. |
| 1,910,303 A | 5/1933 | Maynard |
| 2,477,150 A | 7/1949 | Snyder et al. |
| 2,539,017 A | 1/1951 | Hansen |
| 2,737,371 A | 3/1956 | Gerry |
| 3,063,684 A | 11/1962 | Hayashi |
| 3,271,013 A | 9/1966 | Chambers et al. |
| 5,333,517 A | 8/1994 | Bryson et al. |
| 8,162,530 B2 * | 4/2012 | Lee .............................. 366/129 |
| 2009/0091199 A1 * | 4/2009 | Lee ................................ 310/50 |

* cited by examiner

*Primary Examiner* — David Sorkin
(74) *Attorney, Agent, or Firm* — Leydig, Voit & Mayer, Ltd.

(57) ABSTRACT

A handheld electric mixer has a rotational output spindle for holding mixer work pieces, first and second gears located on the rotational output spindle, and a motor. The first gear is rotationally coupled to the motor output shaft. The mixer includes a two-speed gear-box receiving torque from the motor, and transmitting the torque to the output spindle. The two-speed gear-box includes a rotational lay shaft axially parallel to the rotational output spindle, third and fourth gears located on the lay shaft, the third gear meshing with the first gear and the fourth gear meshing with the second gear. A selector mechanism selects between a first gear ratio and a second gear ratio and includes a clutch disk on the spindle, and moveable axially for alternatively engaging and rotatably locking the one of the third or fourth gears that is engaged with the clutch disk.

6 Claims, 6 Drawing Sheets

HANDHELD ELECTRIC MIXER

RELATED APPLICATIONS

The present application is a continuation-in-part of U.S. patent application Ser. No. 11/867,924, filed Oct. 5, 2007 now U.S. Pat. No. 8,162,530, and published as US Patent Application Publication 2009-0091199 Apr. 9, 2007, the entire contents of which are incorporated herein by reference.

BACKGROUND TO THE INVENTION

1. Field of the Invention

The current invention relates to handheld electric mixers and more particularly to variable speed handheld electric mixers.

2. Background Information

Handheld electric mixers consist of a housing with an uppermost handle and a pair of downwardly extending rotational output spindles that removeably receive work pieces for mixing, beating, blending and or whipping food items or recipe constituents. The spindles are driven by a variable speed motor located in the housing via a reduction gear-box. The electronic variable speed control can be a continuous type, in more expensive mixers, or a stepped speed control, comprising typically 3 stepped speeds, in less expensive mixers. Both speed control methods vary voltage to control the motor speed. Less expensive universal motors often used in such mixers might have a narrow speed torque range and so exhibit poor voltage speed control over the full speed range of the motor. This limits versatility of the mixer which ideally should be able to achieve very low mixer speeds for preparation of delicate food items or recipe constituents through to very high mixing speeds for thoroughly mixing, blending, beating, whipping or otherwise food items or recipe constituents.

SUMMARY OF THE INVENTION

A handheld electric mixer has a housing has a housing, a rotational output spindle located in the housing for holding mixer work pieces, first and second gears located on the rotational output spindle, a motor located in the housing and having a rotational output shaft, the first gear rotationally coupled to the motor output shaft, a two-speed gear-box located in the housing, and receiving torque from the output shaft of the motor, and transmitting the torque to the output spindle, wherein the two-speed gear-box has a first gear ratio for providing a first output speed and a second gear ratio for providing a second output speed, and the first ratio transmits at least twice as much torque to the rotational output spindle as does the second ratio, the two-speed gear-box comprising a rotational lay shaft axially parallel to the rotational output spindle, third and fourth gears located on the lay shaft, the third gear meshing with the first gear and the fourth gear meshing with the second gear, the first gear providing the first gear ratio and the second, third and fourth gears providing the second gear ratio, wherein the third and fourth gears are freely rotatable gears, freely rotatable on the spindle, and a selector mechanism located on the spindle for selecting between the first gear ratio and the second gear ratio shaft gears, the selector mechanism comprising a clutch disk positioned on the spindle, between the third and fourth gears, and moveable axially along the spindle for alternatively engaging and rotatably locking the third or fourth gear that is engaged with the clutch disk.

The handheld electric mixer preferably also includes an electronic speed controller for controlling rotational speed of the motor such that the first gear ratio provide a first range of output speeds and the second gear ration provides a second range of output speeds.

The clutch disk preferably has opposed axial faces, each face having dogs for alternatively engaging the third or fourth gears and rotationally locking the third or fourth gear that is engaged with the clutch disk.

The handheld electric mixer preferably also includes a shifter ring and a linkage, wherein the clutch disk is axially captive with the shifter ring and the shifter ring is coupled to the linkage for moving the shifter ring axially between the third or fourth gears.

The handheld electric mixer preferably also includes a four axis operating lever movable in a transverse left—right direction and longitudinal forward—backwards direction, wherein movement in the transverse left—right direction operates the linkage for moving the shifter ring axially between the third or fourth gears, and movement in the longitudinal forward—backwards direction operates the electronic speed controller for controlling rotational speed of the motor Further aspects of the invention will become apparent from the following description.

BRIEF DESCRIPTION OF THE DRAWINGS

An exemplary form of the present invention will now be described by way of example only and with reference to the accompanying drawings, in which.

DESCRIPTION OF THE EXEMPLARY EMBODIMENTS

Figure 1:
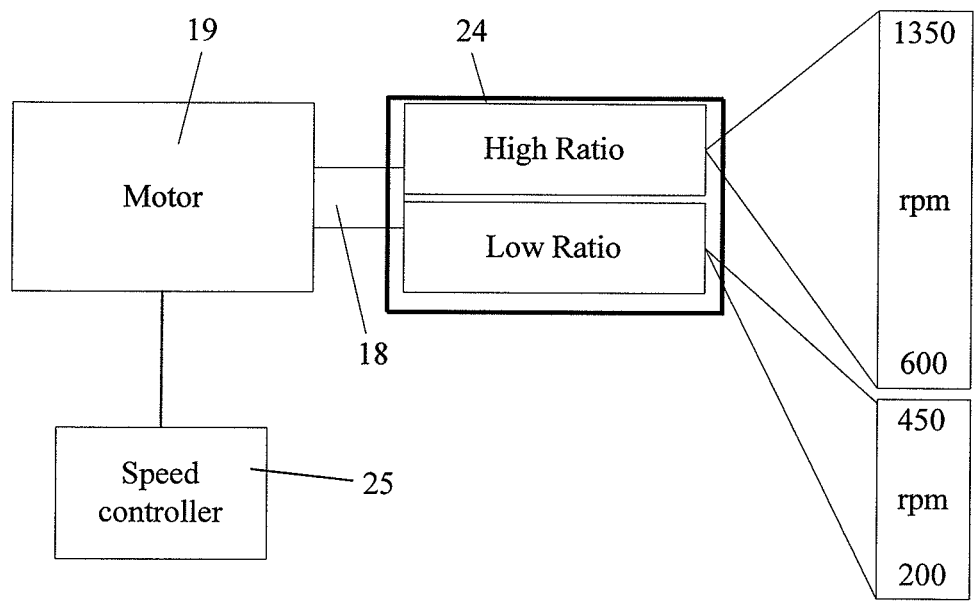
FIG. 1 is a schematic overview of the drive system for a variable speed handheld electric mixer according to the invention.
Figure 2:
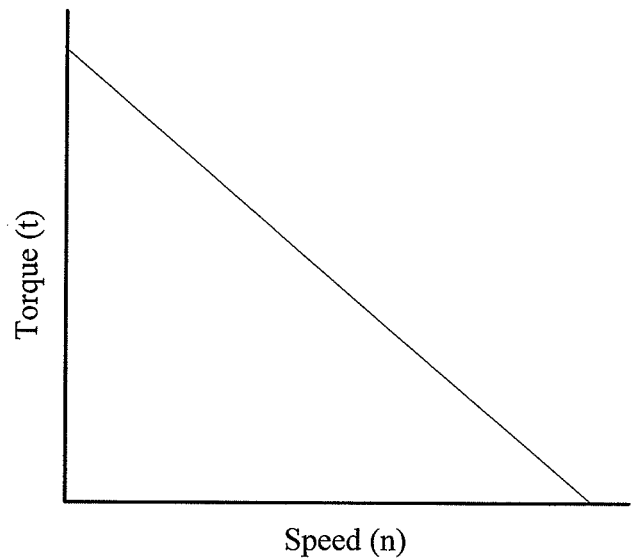
FIG. 2 is a typical speed/torque curve for the present invention compare with a traditional electric motor.

A handheld electric mixer according to the present invention utilises both electronic and mechanical speed control means to provide greater speed and torque ranges than handheld electric mixers hitherto known in the art. Referring to FIGS. 1 and 2, the mixer is driven by a motor 19 having a rotational output shaft 18. Rotational speed of the motor 19 is controlled electronically by an electronic speed controller 25. A two-speed gear-box 24, having low and high gear ratios, receives torque from the output shaft 18 of the motor and transmits it to a pair of rotational output spindles 23. The combination of electronic speed controller 25 and two-speed gear-box 24 provides the chief or cook with a larger range of torque and speed for mixing, blending, beating or otherwise acting upon a food item or recipe constituents. As will be apparent to the skilled addressee, for any give power output torque is inversely proportional to speed (i.e. t=1/n, where t is torque and n is rotational velocity/speed). Therefore, the first, low, gearing ratio provides the mixer with a high torque and low speed output and the second, high, gearing ratio provides the mixer with a low torque and high speed output. In the preferred embodiment the first, low, gearing ratio provide an output speed range of 200-450 revolutions per minute (rpm) for preparation of thick or delicate food items or recipe constituents and the second, high, gearing ratio provide an output speed range of 600-1350 rpm for thoroughly mixing, blending, beating, whipping or otherwise food item or recipe constituents. Mixer speed within each range is controlled via the variable speed motor controller 25. In the preferred embodiment, for any given electronic speed setting the low gearing ratio provides an output torque that is at least twice that of the high gearing ratio. The high gear ratio on the other hand provides a much wider speed/torque range that the low gearing ratio.

Figure 3:
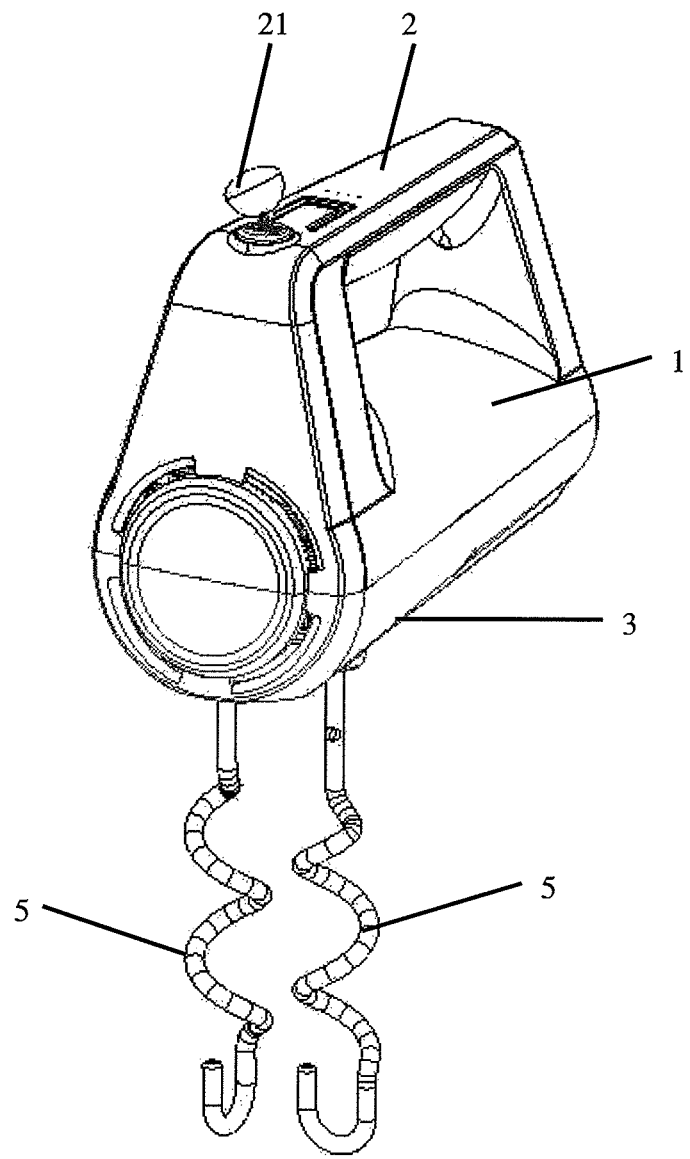
FIG. 3 is a perspective illustration of a manual shift variable speed handheld electric mixer according to the invention.
Figure 4:
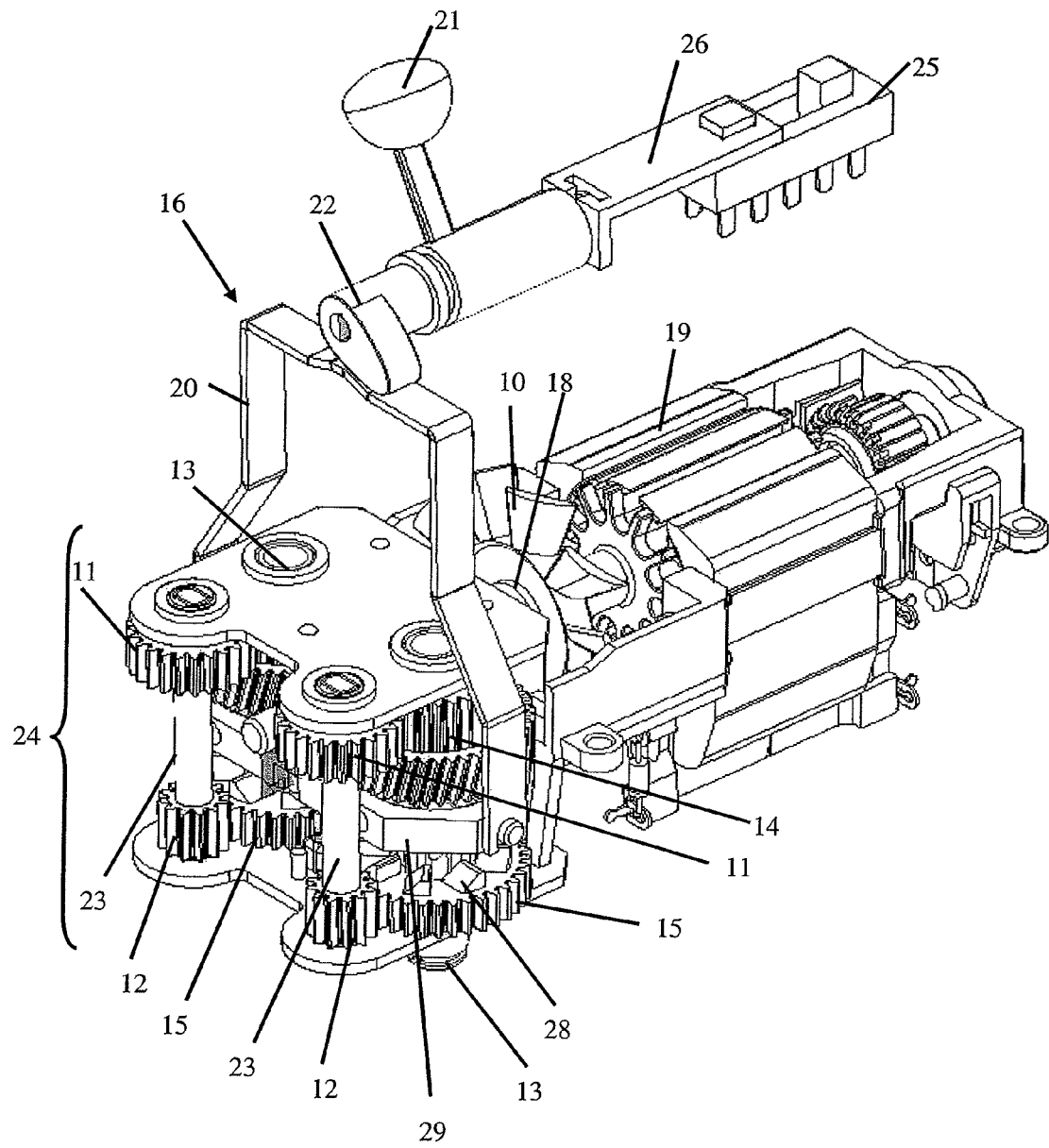
FIG. 4 is an illustration of the gear-box motor and the manual shift system according to the invention, in a first gear ratio.
Figure 5:
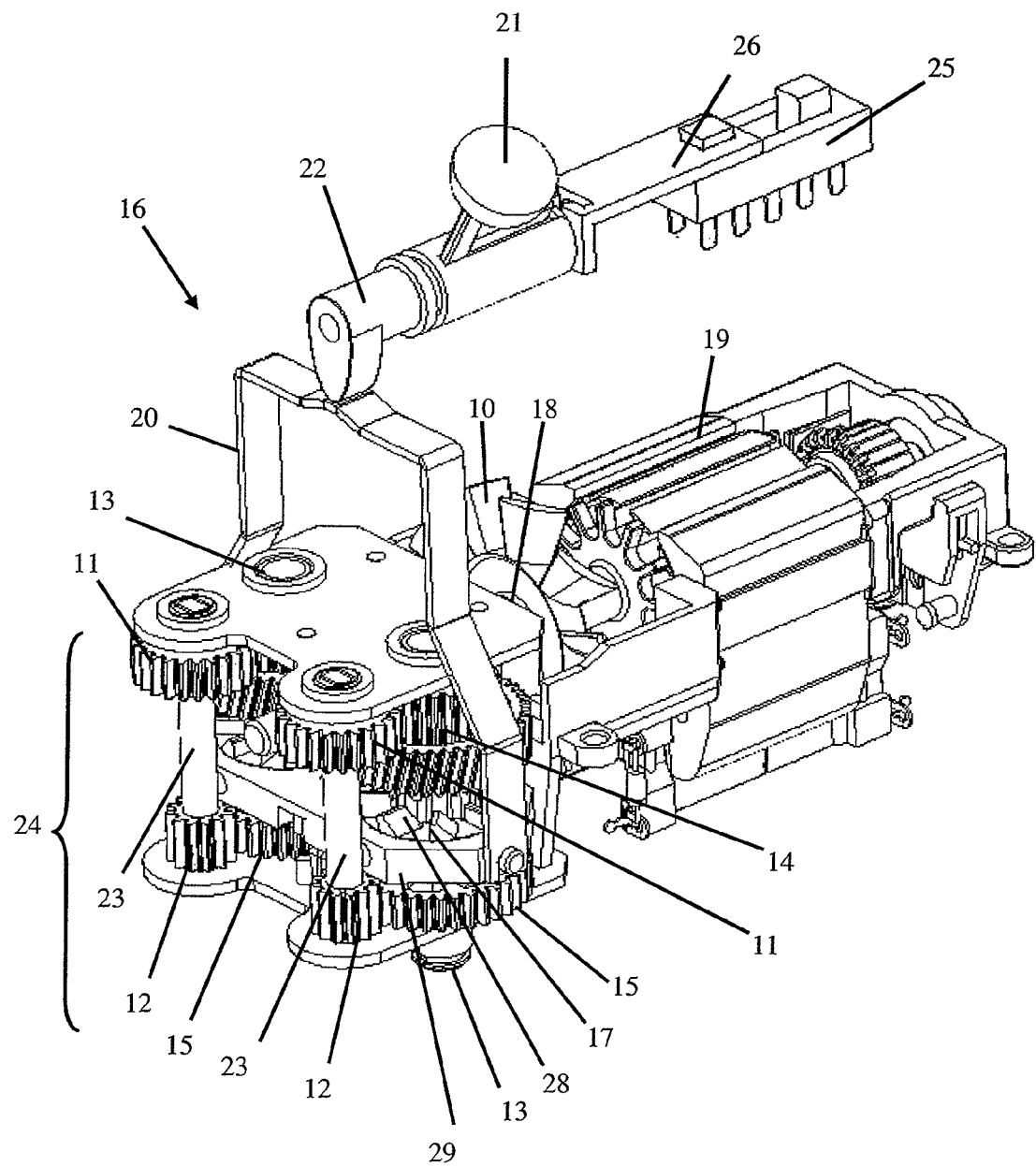
FIG. 5 is an illustration of the gear-box motor and the manual shift system, in a second gear ratio.

Referring to FIGS. 3 to 5 there is shown a first embodiment of gear-box motor and the manual shift system according to the invention. The hand mixer comprises a housing 1 having a handle 2 for holding the mixer. Accessible through an underside 3 of the housing is a pair of adjacent output spindles 23 for removably holding beaters or other work pieces 5 for mixing, blending, beating or otherwise acting upon a food item or recipe constituents being worked upon. Located within the housing is a drive motor 19 with voltage control electronics 25 coupled to speed control switch 21 for varying the speed of the motor 19. The motor 19 has an output shaft 18 on which there are a cooling fan 10. A two-speed gear-box 24 receives torque from the output shaft 18 and transmits the torque to the spindles 23. The gear-box 24 has a first gear ratio for providing a first output speed and a second gear ratio for providing a second output speed. The first ratio transmits at least twice as much torque to the rotational output spindle as does the second ratio. In combination with the electronic speed controller 25 for controlling rotational speed of the motor 19 the first gear ratio provides a first range of output speeds and the second gear ration provides a second range of output speeds.

The following discussion relates to the two speed gear-box 24. For simplicity of description only, where appropriate, one half of the gear-box driving one of the spindles 13 from the output shaft 18 is discussed. The two-speed gear-box 24 has a pair of rotational lay shafts 23 axially parallel to the rotational output spindle 13. First and second gears 11, 12 are fixedly located on respective ends of the rotational lay shafts 23. Third and fourth gears 14, 15 are located on the output spindles 13. The third and fourth gears 14, 15 are freely rotatable gears and can be selected to be freely rotatable on output spindles 13 or to be rotationally locked with the output spindles 13. The third gear 14 receives rotational torque from the motor output 18 and is in meshing engagement with the first gear 11 of the lay shaft 23. The motor output 18 and third gear 14 provides a first gear ratio for providing a first output speed lay shaft 23. The fourth gear 15 is in meshing engagement with the second gear 12 of the lay shaft 23 which together with the first gear 11 provide a second gear ratio for providing the second output speed.

A selector mechanism 16 is located on the lay shaft 13 for selectively locking the third or fourth gears 14, 15 to the spindle 13 thus transmitting torque from the output 28 and third gear 14 to the spindles 23 at the first gear ratio or the second gear ratio. The selector mechanism 16 comprising a clutch disk 17 positioned on the spindle 13 between the third and fourth gears 14, 15. The clutch disk 17 is moveable axially along the spindle 13 for alternatively engaging and rotateably locking the third or fourth gear, 14 15 respectively, that is engaged with the clutch disk 17. The clutch disk 17 has opposed axial faces each having dogs 28 for alternatively engaging with corresponding dogs or recesses in the third or fourth gears 14, 15 and thus rotationally locking the third or fourth gear 14, 15 that is engaged with the clutch disk 17. The selector mechanism 16 also includes a shifter ring 29 located about the clutch disk 17. The clutch disk 17 is axially captive with the shifter ring for moving the clutch disk 17 on the spindle 13. The shifter ring 29 is coupled to a linkage 20 for moving the shifter ring 29 axially between the third or fourth gears 14, 15.

When the clutch disk 17 is engage via dogs 28 with the third gear 14 the spindles 13 are directly driven from the motor output 19 via the third gear 14. In the preferred embodiment this is the high (fast) gear ration. Alternatively, when the clutch disk 17 is engage via dogs 28 with the fourth gear 15 the output spindles are driven from the motor output 18 via third gear 14, lay shaft gears 11, 12 and fourth gear 15, which are driven by the motor output. This is the second lower gear ratio. In this configuration gear 14 is driven my the motor output 18 and fourth gear 15 is locked to the spindle 13 by clutch plate 17/

A four axis operating lever 21 is provided in the upper forward part of the handle of the mixer. The four axis operating lever 21 has an eccentric cam 22 engaging with the linkage 20 such that movement of the level in the transverse left—right axis moves the cam 22 and linkage 20 for moving the shifter ring 29 axially between the third or fourth gears 14, 15. An axial rod 26 couples the lever 21 with the voltage control electronics 25, such that movement of the level in the longitudinal forward—backwards axis operates the voltage control electronics 25 for varying the speed of the motor 19. Thus, a four axis operating lever 21 provides selection between gear ratios and motor speed.

Figure 6:
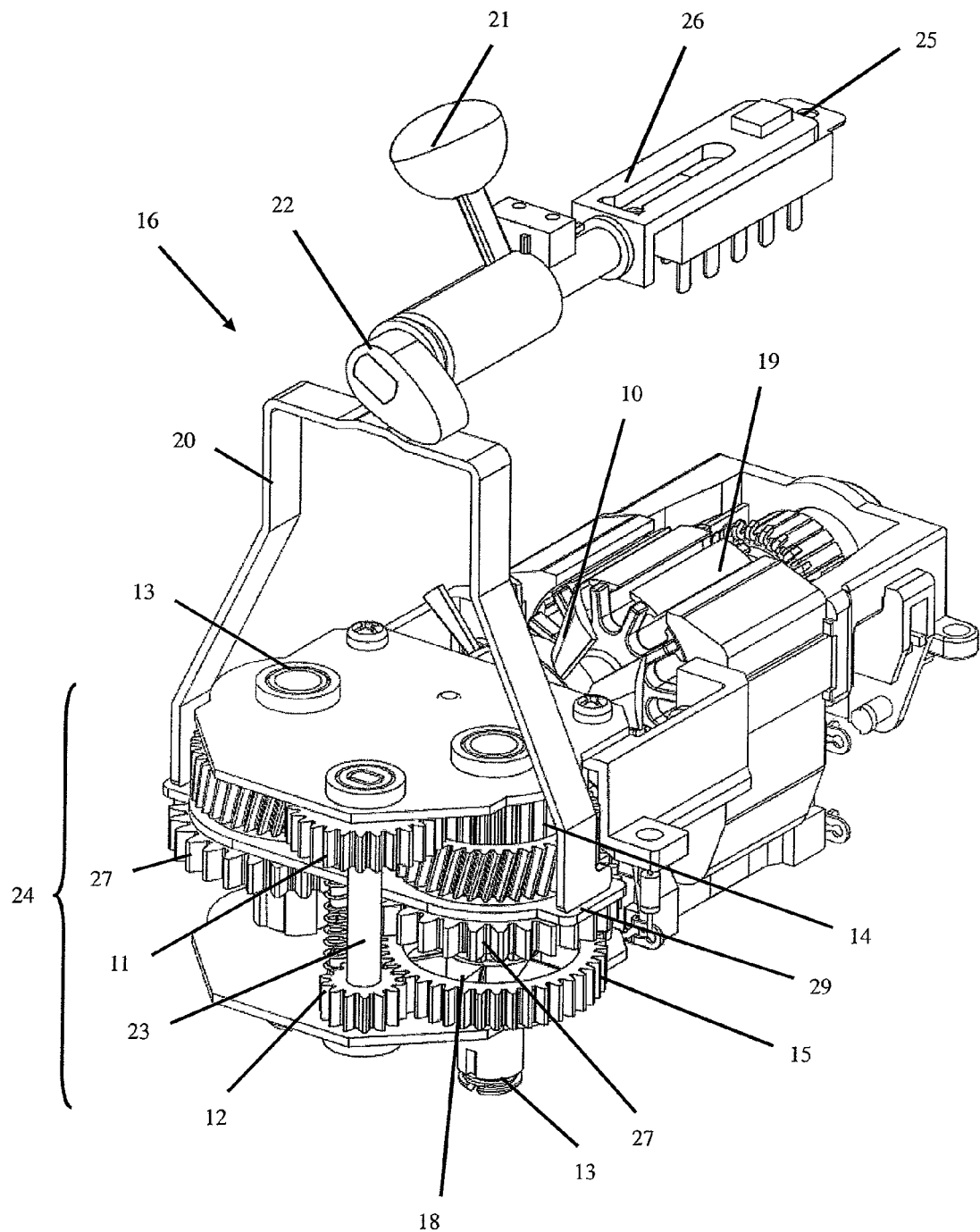
FIG. 6 is an illustration of a second embodiment of the gear-box motor and the manual shift system according to the invention, in a first gear ratio.
Figure 7:
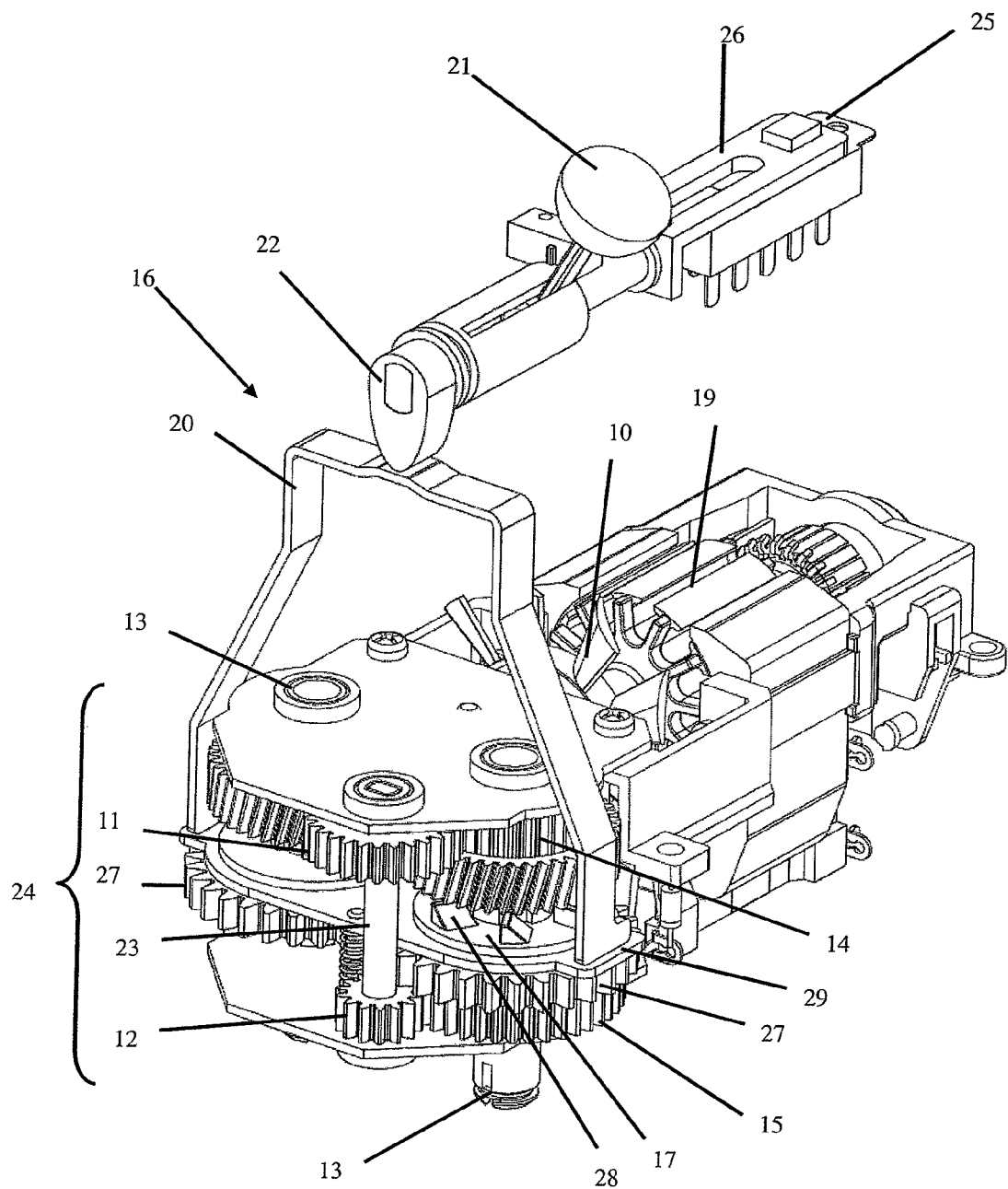
FIG. 7 is an illustration of the second embodiment of the gear-box motor and the manual shift system according to the invention, in a second gear ratio.

Referring to FIGS. 6 and 7 there is shown a second embodiment of gear-box motor and the manual shift system according to the invention. In the second embodiment a pair of transmission gear 27 is welded on the clutch disk 17. The pair of transmission gears 27 is meshingly engaged together and respectively concentric with the output spindles 13. When the clutch disk 17 is engaged on third gear 14, as in FIG. 6, the third gear 14 will output to the lay shaft 13 directly. This is the direct drive (height speed) embodiment. The transmission gears 27 will cause both spindles 13 to turn together in high speed.

In the mixer of the invention the chief or cook has a larger range or speeds for mixing, blending, beating or otherwise acting upon a food item or recipe constituents. By selecting the first, low, gearing ratio and controlling the variable speed motor the cook has greater control of low mixer speeds for preparation of delicate food items or recipe constituents and by selecting the second, high, gearing ratio and controlling the variable speed motor the cook has a greater range of high mixing speeds for thoroughly mixing, blending, beating, whipping or otherwise food item or recipe constituents.

It should be appreciated that modifications and alternations to the invention that are obvious to those skilled in the art are not to be considered as beyond the scope of the present invention.

In one alternative embodiment there is a pair of gears is rotationally concentric and spaced apart along the respective spindles. There is also a pair of parallel lay-shafts such that one lay-shaft is associated with a respective one of the pair of spindles. Positioned on each lay-shaft is a second pair of toothed gears complimentary to the gears on it respective spindle. Each pair of second gears is rotationally concentric and spaced apart along the respective lay-shaft. Within the housing is a variable speed motor and motor control for rotating the lay-shafts which are both rotateably engaged with the motor for rotation of the lay-shafts with the motor.

A selector knob is positioned on the housing of the mixer and associated with a cam mechanism for selectively moving the pairs of second gears longitudinally long the respective lay-shafts between a first position and a second position. Rotation of the selector knob in a first direction moves the pairs of second gears up the lay-shafts until the first ones of the second pairs of gears mesh with the first ones of the pairs of spindle gears. The meshing first gears have diameters and tooth numbers for a first, low, gearing second gears have diameters and tooth numbers for a second, high, gearing ratio causing the output spindles to have a second rotational speed range controlled by the variable speed motor.

What is claimed is:

1. A handheld electric mixer comprising:
   a housing,
   a rotational output spindle located in the housing for holding mixer work pieces,
   a motor located in the housing and having a rotational output shaft,
   a two-speed gear-box located in the housing, receiving torque from the rotational output shaft, and transmitting the torque to the rotational output spindle, wherein
      the two-speed gear-box has a first gear ratio for providing a first output speed and a second gear ratio for providing a second output speed, and the first gear ratio transmits at least twice as much torque to the rotational output spindle as does the second gear ratio,
      the two-speed gear-box comprises
         a rotational lay shaft axially parallel to the rotational output spindle,
         first and second gears located on the lay shaft,
         third and fourth gears located on the rotational output spindle, wherein
            the third gear meshes with the first gear,
            the fourth gear meshes with the second gear,
            the third gear is coupled to the rotational output shaft and provides the first gear ratio,
            the first, second, and fourth gears provide the second gear ratio, and
            the third and fourth gears are freely rotatable gears, freely rotatable on the rotational output spindle, and
         a selector mechanism located on the rotational output spindle for selecting between the first gear ratio and the second gear ratio, wherein the selector mechanism comprises a clutch disk positioned on the rotational output spindle, between the third and fourth gears, and moveable axially along the rotational output spindle for alternatively engaging and rotatably locking, with the rotational output spindle, the one of the third and fourth gears that is engaged with the clutch disk.

2. The handheld electric mixer of claim 1 further including an electronic speed controller for controlling rotational speed of the motor.

3. The handheld electric mixer of claim 1 wherein the clutch disk has opposed axial faces, each face having dogs for alternatively engaging the third and fourth gears and rotationally locking the one of the third and fourth gears that is engaged with the clutch disk.

4. The handheld electric mixer of claim 1 further including a shifter ring and a linkage, wherein
   the clutch disk is held axially captive by the shifter ring, and
   the shifter ring is coupled to the linkage for moving the shifter ring, axially, between the third and fourth gears.

5. The handheld electric mixer of claim 4 further including an electronic speed controller for controlling rotational speed of the motor.

6. The handheld electric mixer of claim 5 further including an operating lever movable in a transverse left-right direction and in a longitudinal forward-backwards direction, wherein
   movement of the operating lever in the transverse left-right direction operates the linkage for moving the shifter ring axially, between the third and fourth gears, and
   movement of the operating lever in the longitudinal forward-backwards direction operates the electronic speed controller for controlling rotational speed of the motor.

\* \* \* \* \*